J. C. FIDDYMENT.
TIRE CORE SAWING MACHINE.
APPLICATION FILED SEPT. 21, 1918.

1,339,815.

Patented May 11, 1920.
3 SHEETS—SHEET 1.

Inventor
J. C. Fiddyment

Attorney

J. C. FIDDYMENT.
TIRE CORE SAWING MACHINE.
APPLICATION FILED SEPT. 21, 1918.
1,339,815.
Patented May 11, 1920.
3 SHEETS—SHEET 2.
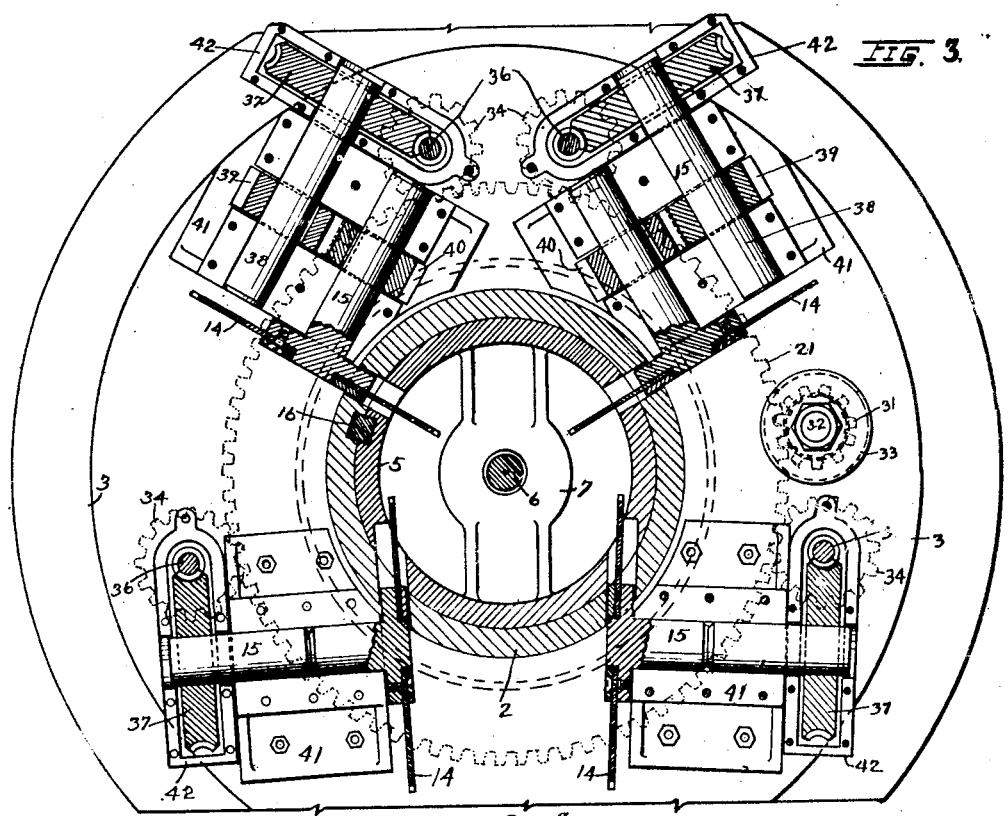
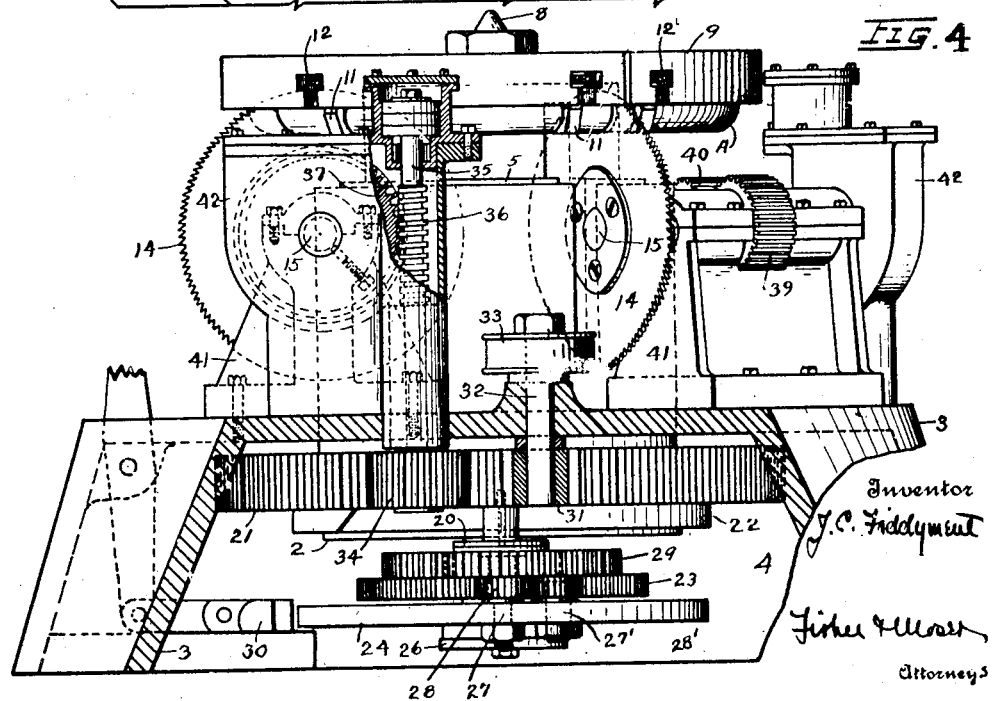

J. C. FIDDYMENT.
TIRE CORE SAWING MACHINE.
APPLICATION FILED SEPT. 21, 1918.
1,339,815.
Patented May 11, 1920.
3 SHEETS—SHEET 3.
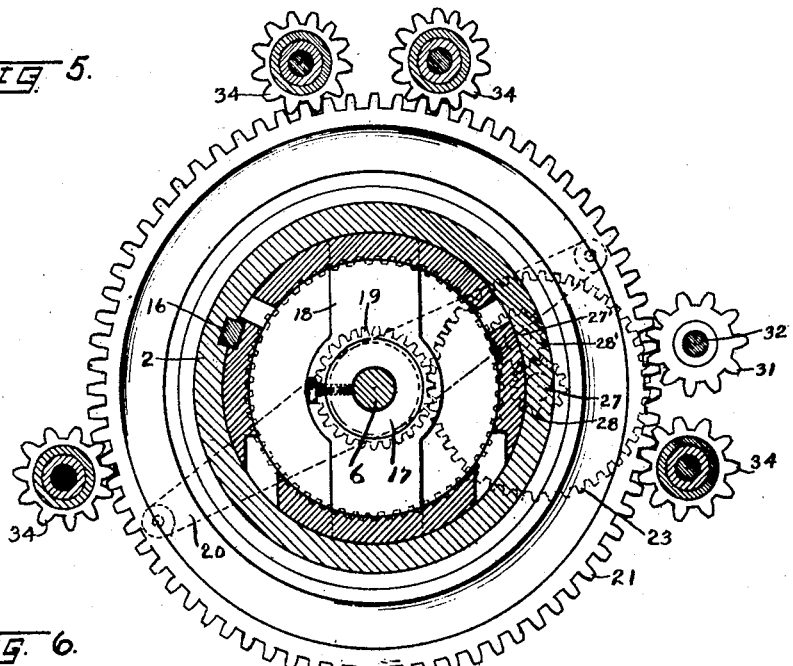
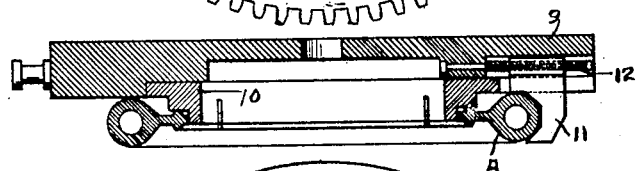
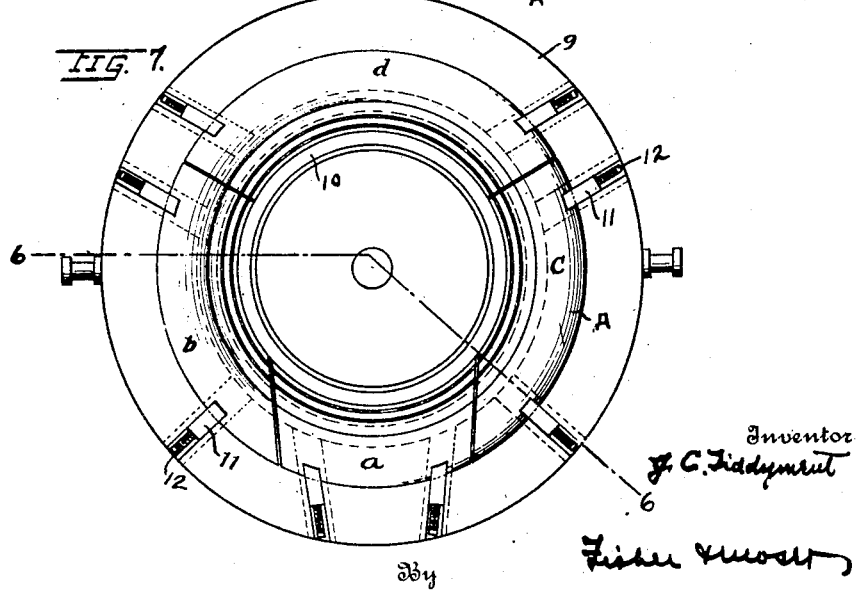
Inventor
J. C. Fiddyment
By Fisher & ...
Attorneys

UNITED STATES PATENT OFFICE.

JOHN C. FIDDYMENT, OF AKRON, OHIO.

TIRE-CORE-SAWING MACHINE.

1,339,815.      Specification of Letters Patent.      Patented May 11, 1920.

Application filed September 21, 1918. Serial No. 255,160.

*To all whom it may concern:*

Be it known that I, JOHN C. FIDDYMENT, a citizen of the United States, residing at Akron, in the county of Summit and State of Ohio, have invented certain new and useful Improvements in Tire-Core-Sawing Machines, of which the following is a specification.

This invention pertains to a sawing machine, the object being to provide a machine adapted to produce a multiple number of saw cuts on radial and tangent lines simultaneously, and the machine is especially designed to saw a cast-metal tire-molding core of circular form into segmental sections of varying shape but with such uniformity and accuracy that corresponding sections will be exactly alike to permit interchange. The invention involves the placement of the work upon the bottom side of a platen which is removably mounted upon a suitable support adapted to be raised and lowered relatively to a set of circular saws which are angularly related and operate in vertical planes, and the rotation of the saws and feeding of the work to the saws is accomplished by a simple and compact arrangement of power-driven mechanism substantially as herein shown and described and more particularly pointed out in the claims.

Figure 1:
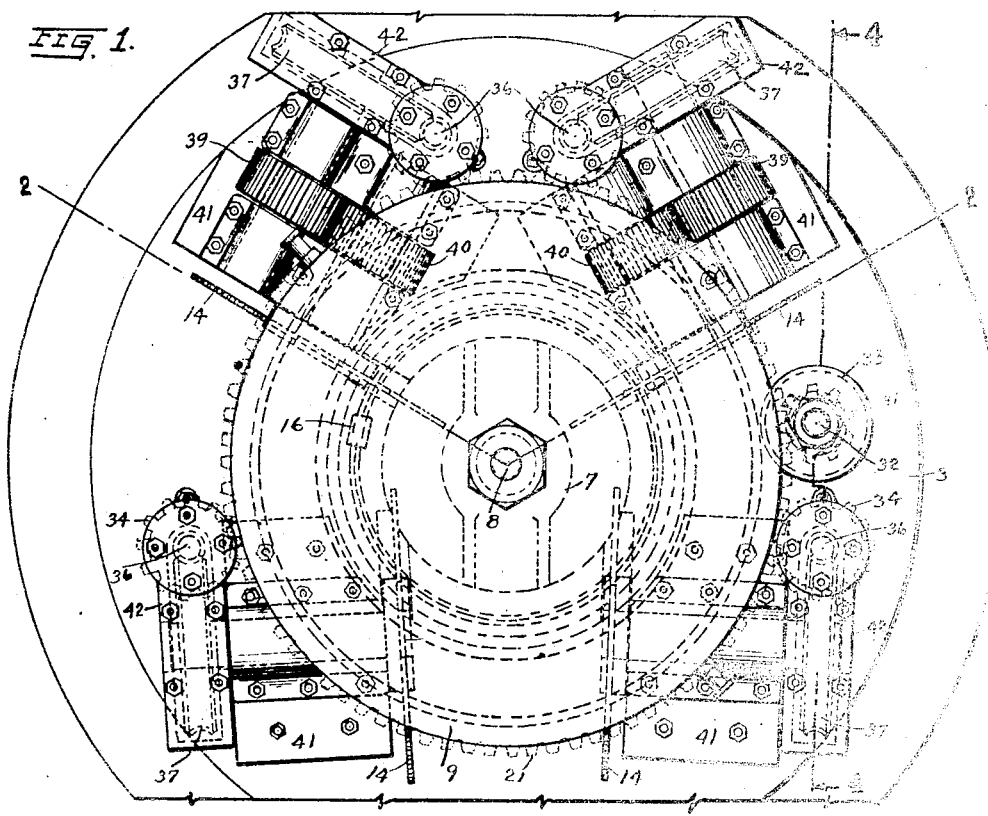
Figure 2:
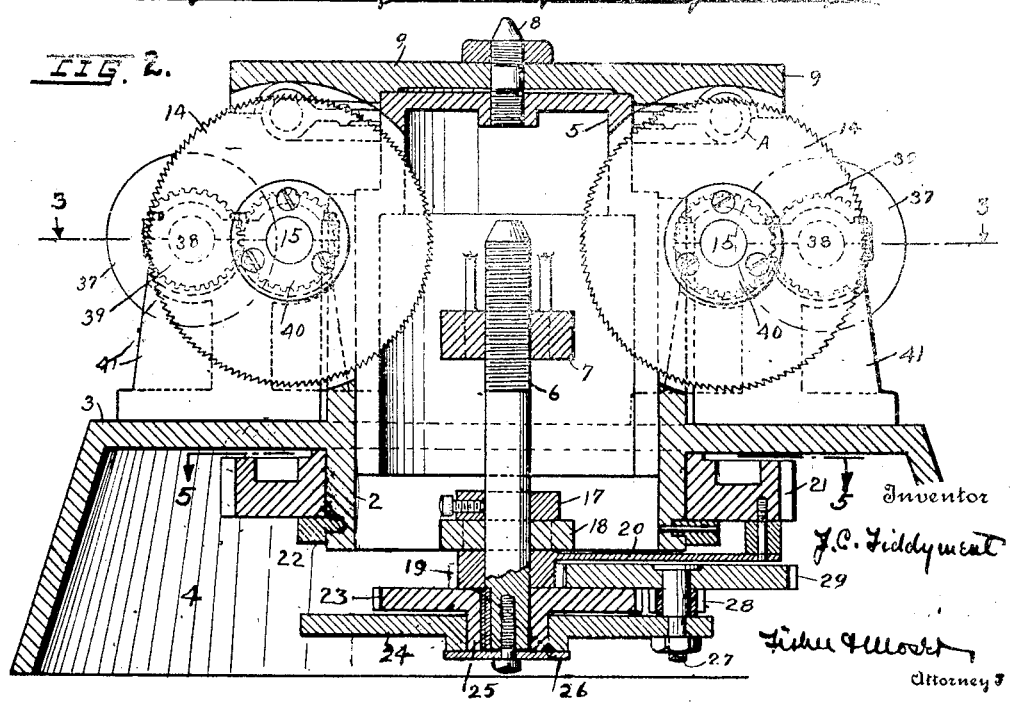

In the accompanying drawings, Figure 1 is a plan view of my tire-core sawing machine, and Fig. 2 is a cross section in a vertical plane on line 2—2, Fig. 1. Fig. 3 is a plan view and section on the horizontal line 3—3, Fig. 2. Fig. 4 is a side elevation and section on line 4—4, Fig. 1. Fig. 5 is a plan view and cross section of the gearing within the base, looking downward from line 5—5, Fig. 2. Fig. 6 is a sectional view of the disk platen with a tire-core secured thereto, and Fig. 7 is a bottom view of Fig. 6.

The machine comprises a round upright cylinder 2 having a spreading base 3 forming a chamber 4 within which the main operating gearing is confined, and the cylinder 2 contains a cylindrical member or piston 5 which may be raised and lowered by a vertical screw 6 engaged with a cross piece 7 within the piston. The upper end of piston 5 has a flat top provided with a stud or screw 8 adapted to receive and center a round plate or disk platen 9 which has a circular ring 10 removably socketed in or upon its bottom side, Fig. 6, to seat and center the work, which in this instance consists of a tire-molding core —A—. In its original state this core is in the form of an endless cast-metal ring, either hollow or solid. Any suitable means may be used to secure the core A upon the platen, but as shown a series of clamps 11 operated by screws 12 are mounted to slide upon the platen and adapted to clamp the core rigidly upon the platen, and one or more of these clamps may be used for each segment cut from the circular core A.

In one type of sectional core in use there are four segments $a$, $b$, $c$, and $d$, (see Fig. 7) and the key segment or section —$a$— is cut slightly wedge-shape and small enough to permit its withdrawal inwardly toward the center of the ring. Furthermore, the two dividing lines between segments $a$, $b$ and $c$, are tangentially related to the center of the core or ring, whereas the two dividing lines between segments $b$, $c$ and $d$, are preferably radial. To permit simultaneous sawing on these four dividing lines or on diverging lines, I mount a multiple number of circular saws 14, Fig. 3, on separate shafts 15 and place the shafts in different angular relations in substantially the same horizontal plane and rotate the saws in a vertical plane to engage the core A simultaneously at different points when the piston 5 and core A are lowered together by rotation of the feed screw 6, Fig. 2. The side walls of the piston are slotted longitudinally to receive the saws and permit vertical movement of the piston, and rotation of the piston is prevented by a key 16, see Fig. 5. Screw 6 has a collar 17 resting on a cross bar 18 integral with or fixed at the bottom of cylinder 2 and said screw extends through said cross bar and carries a loose pinion 19 having an arm 20 connected with a master or main gear 21 which is rotatably held upon the lower end of cylinder 2 by a split or sectional ring 22 or other suitable device. Screw 6 also has a gear 23 splined thereon beneath pinion 19, and a disk or brake wheel 24 rotates freely on hub 25 of gear 23, while a washer 26 or other device is affixed to the bottom end of screw 6 to hold disk 24 and the parts superposed thereon in working relation. Disk 24 carries a pair of studs 27 and 27' which hold small pinions 28 and a gear 29 whereby screw 6 may be rotated at a slow speed in one direction when the disk is held stationary by a brake shoe 30, see Fig. 4. Otherwise the several gears and pinions and screw 6 rotate together in a reverse direction at the higher speed of the master gear 21 which is driven by a pinion 31 on a short shaft 32, Fig. 4, having either a gear or pulley 33 above the base 3 to receive power from any suitable source.

Each saw 14 is operated by a small pinion 34 in mesh with main gear 21, Figs. 4 and 5, and secured at the lower end of a vertical shaft 35 having a worm 36 which meshes with a worm gear 37, two such worm gears being mounted on two of the saw shafts 15, and the other two worm gears 37 being mounted on short counter shafts 38 which have small gears 39 in mesh with similar gears 40 on the saw shafts 15 having the saws 14 for producing the radial cuts in the core A. Suitable brackets and bearings 41 support the saws and their respective shafts and gears, and the gears are preferably incased in a housing 42.

In operation, the endless tire core A is first secured upon the platen by the clamps 11, and the platen then secured in an inverted position upon the flat top of piston 5 while it is in an elevated position so as to place the tire-core immediately above the saws. The power is then applied to rotate the gearing and screws 6 so as to feed the piston and the tire core downwardly at a slow speed until the saws engage the core and sever the same into four sections simultaneously on the radial and tangential lines fixed by the angularly-related saws. The brake shoe 30 is then released from wheel 24 to permit a planetary movement of gears 28 and 29 and cause a reverse rotation of screw 6 at a higher speed, thereby raising the platen and disengaging the work from the saws so that the platen and the severed sections may be removed and the operation repeated on another endless tire core.

What I claim is:

1. In a tire-core sawing machine, a multiple number of saws disposed about a common center, a movable support centrally situated relatively to said saws, and means adapted to secure an annular tire-core to said support at points intermediate the saws.

2. In a tire-core sawing machine, a plurality of circular saws arranged to sever an annular tire-core into segmental sections, and holding means for each segmental section of said tire-core.

3. In a tire-core sawing machine, a plurality of circular saws rotating about axes extending in part radially and in part tangentially relatively to a circle, and means to support an annular tire core in severable relations in respect to said saws and centrally as to center of said circle.

4. A tire-core sawing machine having a set of angularly-related circular saws, means for exposing different portions of the tire-core to said saws simultaneously so as to sever the tire-core into a multiple number of segmental sections, and means adapted to rigidly hold each separate segmental section to be severed.

5. A sawing machine comprising a set of circular saws rotating in different angularly-related planes, and a supporting member for a circular tire core mounted opposite said saws and movable in respect thereto and having separate clamping means for a multiple number of segmental sections of said tire-core.

6. A tire-core sawing machine, comprising a multiple number of circular saws in part radially and in part tangentially-disposed respectively as to a circle and means to bring the tire-core into relations to be cut by said saws, whereby a tire-core may be severed into a multiple number of segmental sections of different sizes and shapes simultaneously.

7. A tire-core sawing machine, comprising a plurality of circular saws mounted on separate shafts lying at different angles about a common center, means to rotate said shafts simultaneously, a plate and means adapted to fix the tire-core to the bottom face of said plate, and a movable support to bring the tire-core and the saws together to sever the tire-core into segmental sections.

8. A tire-core sawing machine comprising a movable member having a removable plate provided with means to detachably secure an annular tire-core thereon, and a multiple number of circular saws mounted at different points about said member and adapted to sever said tire-core into segmental sections.

9. A tire-core sawing machine comprising a set of circular saws arranged about a common center, a tire-core holding plate and a support movable downward having a central stud for said plate, and means to rotate said saws and operate said support to sever a tire-core thereon into segmental sections.

10. A tire-core sawing machine comprising a disk and means to hold an annular tire-core at different radial points on the bottom thereof, a series of circular saws beneath said tire-core and means to rotate said saws, a depressible support for said disk, and means to move said support and the parts carried thereby downward relatively to the cutting edge of said saws.

11. A tire-core sawing machine, comprising a set of circular saws arranged to intersect a circle at spaced intervals, and gear mechanism to actuate said saws involving a main gear having its axis coincident with the center of said circle.

12. A tire-core sawing machine, comprising a plurality of circular saws arranged to intersect a circle, and a movable support for the work and a main driving gear for the saws centrally related to all of the saws.

13. A tire-core sawing machine, comprising a plural number of saws arranged to intersect a circle, a movable support for the work centrally related to said saws, feed mechanism for said support, and gear mechanism to operate said saws and feed mechanism.

14. A tire-core sawing machine, comprising a multiple number of circular saws grouped to intersect a circle at spaced intervals, a movable member to support a tire-core opposite said saws, a feed screw to operate said member, and gear mechanism to rotate the saws and said feed screw.

15. A tire-core sawing machine, comprising a stationary support having a vertically-movable member therein adapted to support a tire-core, a multiple number of circular saws mounted upon said support at spaced intervals around said member adapted to divide a tire-core into segmental sections, and power mechanism adapted to rotate said saws and actuate said member simultaneously.

16. A tire-core sawing machine, comprising a cylinder having a cylindrical member slidably mounted therein, a feed screw for said member, a tire-core holding plate affixed to said member, a set of circular saws grouped around said member opposite said plate, and gear mechanism adapted to rotate said screw and saws.

17. A tire-core sawing machine, comprising a cylinder having a movable piston provided with a removable holding platen for a tire-core, a plural number of circular saws grouped around said cylinder beneath said platen, a feed screw to operate said piston, and a main gear having separate lines of gear mechanism operated thereby which lead to and rotate said feed screws and saws, respectively.

18. A tire-core sawing machine, comprising a stationary base having an upright cylinder, a movable piston within said cylinder, a removable platen upon said piston having tire-core holding means, a set of circular saws mounted upon said base beneath said platen, a feed screw for said piston, and gear mechanism adapted to drive said feed screw and saws.

19. A tire-core sawing machine, comprising a work holder, a multiple number of circular saws grouped in a circle opposite said holder, a main gear, operating mechanism for each saw in gear connection with said main gear, and a feeding device for said work holder having a train of gears operated by said main gear.

20. A tire-core sawing machine, comprising a support and holder for a tire-core, a plurality of circular saws adapted to divide the tire-core into segmental sections, gear mechanism adapted to rotate said saws, a feed screw to operate said support, gear mechanism to operate said screw involving gears having a planetary movement relatively to said screw, and means to arrest the planetary movement of said gears and reverse the rotation of the feed screw.

Signed at Akron, in the county of Summit and State of Ohio, this 4th day of September, 1918.

JOHN C. FIDDYMENT.